United States Patent
Bae et al.

[11] Patent Number: 5,832,387
[45] Date of Patent: Nov. 3, 1998

[54] ADAPTIVE POWER ALLOCATING METHOD AND APPARATUS FOR MULTICARRIER TRANSMISSION SYSTEM

[75] Inventors: Hee-moon Bae, Kyungki-do; Il-keun Park, Suwon, both of Rep. of Korea

[73] Assignee: Samsung Electronics Co., Ltd., Kyungki-ko, Rep. of Korea

[21] Appl. No.: 581,113

[22] Filed: Dec. 29, 1995

[30] Foreign Application Priority Data

Apr. 29, 1995 [KR] Rep. of Korea .................. 1995-10545

[51] Int. Cl.$^6$ .............................. H04B 7/005; H04L 27/28
[52] U.S. Cl. ........................... 455/522; 455/69; 455/103; 455/127
[58] Field of Search ..................................... 455/101, 103, 455/104, 105, 63, 68, 69, 126, 127, 50.1, 522; 370/468, 480; 375/260

[56] References Cited

U.S. PATENT DOCUMENTS

| | | | |
|---|---|---|---|
| 4,731,816 | 3/1988 | Hughes-Hartogs | 455/68 |
| 4,777,653 | 10/1988 | Bonnerot et al. | 455/69 |
| 5,204,970 | 4/1993 | Stengel et al. | 455/69 |
| 5,377,221 | 12/1994 | Munday et al. | 455/63 |
| 5,479,447 | 12/1995 | Chow et al. | 370/468 |

*Primary Examiner*—Reinhard J. Eisenzopf
*Assistant Examiner*—Lester G. Kincaid
*Attorney, Agent, or Firm*—Burns, Doane, Swecker & Mathis, L.L.P.

[57] ABSTRACT

An original data signal is transmitted by a predetermined transmission power, the data signal distorted during transmission is received, and the received signal is output after being restored to the original data signal, the SNR for each subchannel is calculated and a higher power is allocated to a subchannel having a higher SNR and a lower power is allocated to a subchannel having a lower SNR. If the transmission power of each subchannel exceeds a maximum limit, the maximum limit is redetermined as the transmission power of the subchannels whose transmission power exceeds the maximum limit. Then, the transmission power of a subchannel whose SNR is negative is determined if the transmission power of each subchannel does not exceed the maximum limit or the above redetermination step is completed. Thereafter, the transmission power of each subchannel is controlled to the determined power. As a result, the data transmission efficiency is increased and the power is not allocated near the subchannel having negative SNR value, to thereby prevent power loss.

11 Claims, 9 Drawing Sheets

ADAPTIVE POWER ALLOCATING METHOD AND APPARATUS FOR MULTICARRIER TRANSMISSION SYSTEM

BACKGROUND OF THE INVENTION

The present invention relates to a transmission system adopting a multicarrier modulation method, and more particularly, to an adaptive power allocating apparatus and method for a multicarrier transmission system in which high quality transmission is guaranteed by allocating a relative amount of power to a subchannel having high signal-to-noise ratio (SNR).

The multicarrier modulation method is the optimum modulation method in which data approximating channel capacity can be transmitted with a minimal error probability in a channel having interference between symbols. The basic structure thereof is as follows.

Figure 1:
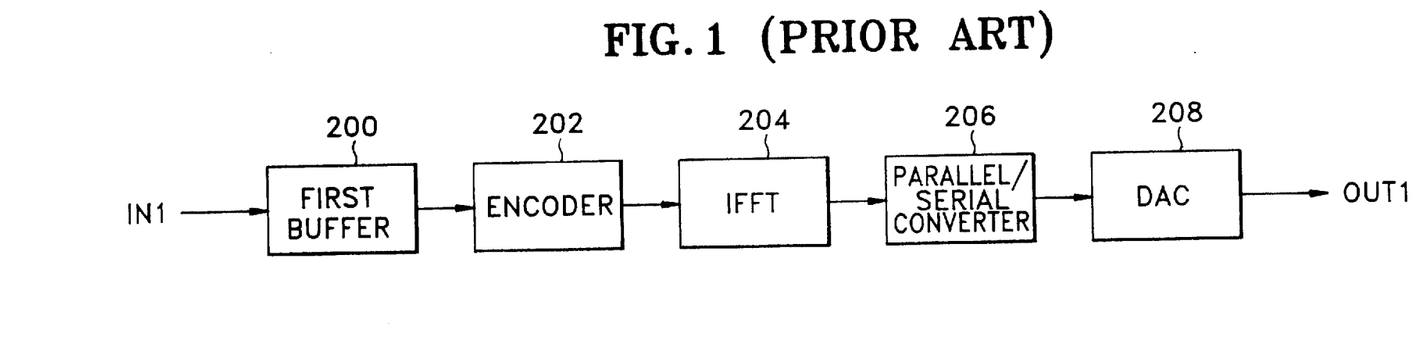
FIG. 1 is a block diagram illustrating the basic structure of a transmission portion of a multicarrier modulation system.

FIG. 1 is a block diagram showing the basic structure of the transmission portion of a multicarrier modulation system. The transmission portion comprises a first buffer 200, an encoder 202, an inverse fast Fourier transformer (IFFT) 204, a parallel/serial converter 206, and a digital-to-analog converter (DAC) 208.

The bit stream whose transmission speed is R bits per second (b/s) is input through an input terminal IN1, and if the symbol period of the bit stream is T, the bit stream is input to first buffer 200 by b bits. Here, b is equal to RT, wherein T is time. The bit stream input to first buffer 200 is assigned to N' subchannels in encoder 202 and then changed into a complex subsymbol $X_i$ having both amplitude and phase. $X_i$ represents ith quadrature amplitude modulation (QAM) signal of the multicarrier transmission and has $2^{b_i}$ constellation points with respect to each subchannel. Time-domain samples having N real numbers are made from the encoded N' complex QAM signals via N(=2N') complex IFFT 204, utilizing following formula (1). Here, time-domain samples are multicarrier symbols.

$$x_n = \frac{1}{\sqrt{N}} \sum_{i=0}^{N-1} X_i e^{j\frac{2\pi}{N} in} \qquad (1)$$

A plurality of samples (N) are output from parallel/serial converter 206 as one output, then changed into a continuous-time modulated signal x(t) via DAC 208, then output to an output terminal OUT1, and transmitted via a channel.

Here, continuous-time modulated signal x(t) is interrupted by a noise component n(t) on the transmission pathway.

Figure 2:
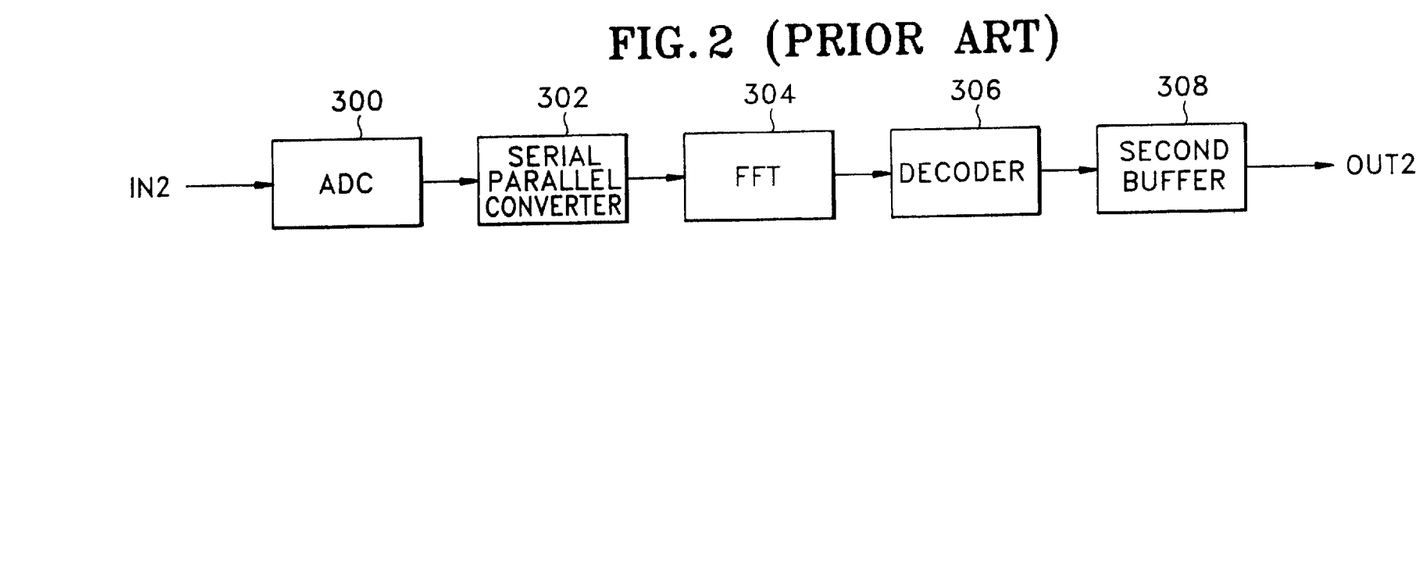
FIG. 2 is a block diagram illustrating the basic structure of a reception portion of a multicarrier modulation system.

FIG. 2 is a block diagram showing a basic structure of a reception portion of the multicarrier modulation system. The reception portion comprises an analog-to-digital converter (ADC) 300, a serial/parallel converter 302, a fast Fourier transformer (FFT) 304, a decoder 306 and a second buffer 308.

A discrete multi tone (DMT) signal y(t) containing a noise interruption during transmission through the channel is input to an input terminal IN2, converted into a digital signal by ADC 300, converted into a parallel form by serial/parallel converter 302, and then input to complex FFT 304. FFT 304 receives the digital DMT signal and restores the signal to the transmitted ith QAM signal $X_i$ by N(=2N') complex fast Fourier transforming, utilizing following formula (2).

$$X_i = \frac{1}{\sqrt{N}} \sum_{i=0}^{N-1} x_n e^{-j\frac{2\pi}{N} in} \qquad (2)$$

The restored signal $X_i$ is decoded by decoder 306, restored to the original bit stream of R b/s via second buffer 308, and then output to an output terminal OUT2.

The advantages and disadvantages of the multicarrier modulation system are as follows.

When the transmission channel characteristics are flat, there is no problem in the multicarrier modulation method. However, when the transmission channel characteristics are varied by a noise component generated from an adjacent channel, the performance thereof is lowered. This problem will be described below, with reference to the following example.

As an example of a transmission system adopting the multicarrier modulation method, there is an asymmetric digital subscriber line (ADSL) system useful as a transmitter for multimedia. The ADSL system is new technology in which a conventional copper wired line can be used without modification and the signal can be transmitted to subscribers within a range of 3–4 km without using a repeater by the conventional telephone service and ISDN basic access at a mixed high data transfer speed of 6 Mb/s. Also, the DMT method, a kind of multicarrier modulation method is fixed as the US standard modulation method for the ADSL system.

The conventional copper wired line bundle is generally composed of fifty wires and signals for each different service, that is, ADSL, HDSL, ISDN and a T1 carrier, can coexist in the same bundle. Thus, a cross talk phenomenon, i.e., inductive interference, may be generated by the signal of an adjacent copper wired line. Here, a near-end-crosstalk-talk (NEXT) generated from the T1 carrier is the severest problem. Thus, if T1 NEXT exists in the copper wired line during a transmission of 6 Mb/s in the ADSL system adopting the multicarrier modulation method, the ADSL system does not satisfy the US ADSL standard.

Figure 3:
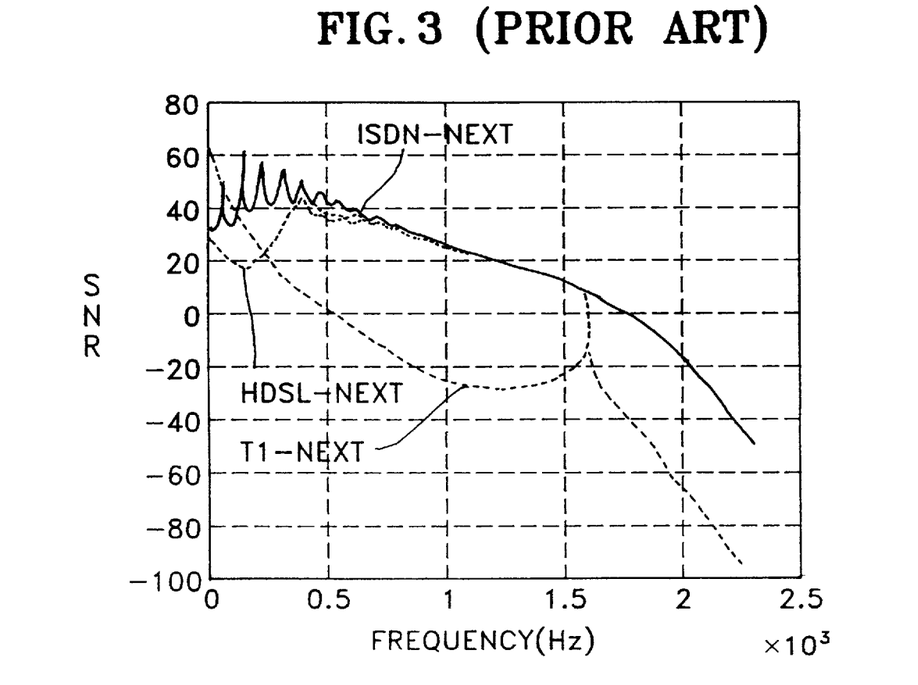
FIG. 3 is a graph showing a computer-simulated interference phenomenon in the adjacent copper wired line.

FIG. 3 is a graph showing a computer-simulation of the interference phenomenon in an adjacent copper wired line. In case where ADSL, HDSL and the T1 signals generate the interference phenomenon in FIG. 3, the SNR of the T1 carrier signal has a negative value in the frequency range of 500 KHz and above. Thus, the band of 500 KHz and above cannot be used due to the serious influence of the interference signal.

As prior art for preventing a decrease in efficiency caused by the interference signal, there is a method for increasing the transmission power.

Figure 4:
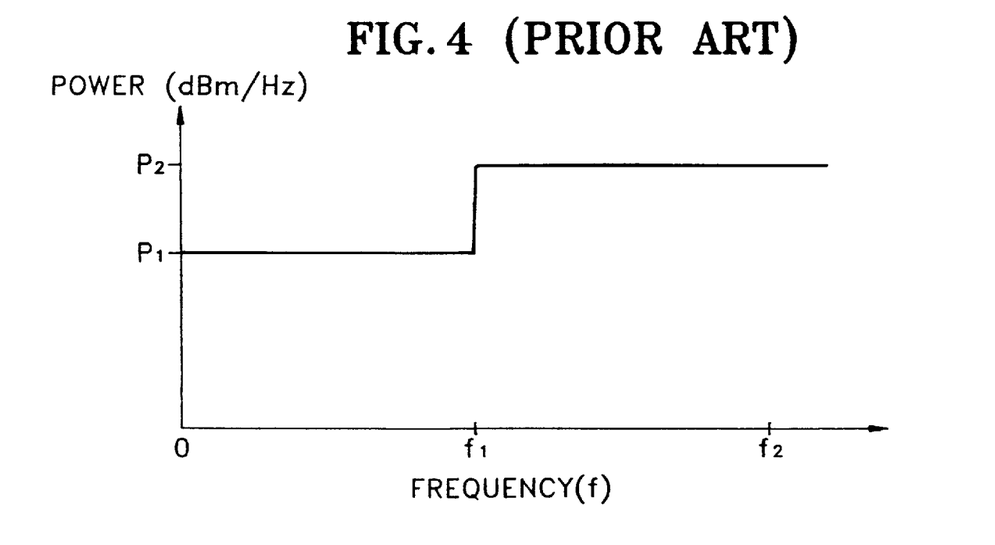
FIG. 4 is a graph showing increased transmission power of the frequency band to increase the SNR shown in FIG. 3.

FIG. 4 is a graph showing increased transmission power of the frequency band to increase the SNR shown in FIG. 3.

However, referring to the curve showing the efficiency loss due to T1-NEXT shown in FIG. 3, since the SNR is decreased remarkably in the specific frequency band of 500 KHz to 1.4 MHz, the transmission power has to be increased to 10–25 dB and above to obtain a positive value for the SNR so that the signal can be transmitted. However, if the transmission power is increased as above, the power consumption of the system increases and also the transmission signal of the system generates interference in other transmission systems.

SUMMARY OF THE INVENTION

To solve the above problems, it is an object of the present invention to provide an adaptive power allocating method for a multicarrier transmission system in which relatively more information is assigned to a subchannel of a frequency region having a high SNR than that having a low SNR.

It is another object of the present invention to provide an adaptive power allocating apparatus suitable for performing the above method.

To achieve the first object of the present invention, there is provide an adaptive power allocating method for a multicarrier transmission system in which an original data signal is transmitted with a predetermined transmission power, the data signal distorted by a noise signal during transmission is received, and the received signal is output after being restored to the original data signal, comprising the steps of: (a) calculating an SNR for each subchannel; (b) determining the transmission power value for each subchannel, so that a higher power value is allocated to a subchannel having a higher SNR, and a lower power value is allocated to a subchannel having a lower SNR; (c) judging whether the transmission power of each subchannel exceeds the maximum transmission power limit; (d) redetermining the maximum transmission power limit as the transmission power of the subchannels whose transmission power exceeds the maximum transmission power limit if the step (c) is satisfied; (e) redetermining the transmission power of a subchannel whose SNR is negative, if the step (c) is not satisfied or the step (d) is completed; and (f) changing the transmission power of each subchannel into the power determined at the steps (b), (d) and (e).

To achieve the second object of the present invention, there is provide an adaptive power allocating apparatus suitable for a multicarrier transmission system comprising: carrier transmission means for transmitting an original data signal with a transmission power determined in response to a control signal, receiving the data signal distorted by a noise signal during transmission, and restoring the received data signal to the original data signal to output the restored data signal; and power controlling means for determining the transmission power for each subchannel by receiving the distorted data signal, and outputting the control signal for controlling the data signal in order to be transmitted using the determined transmission power.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 5:
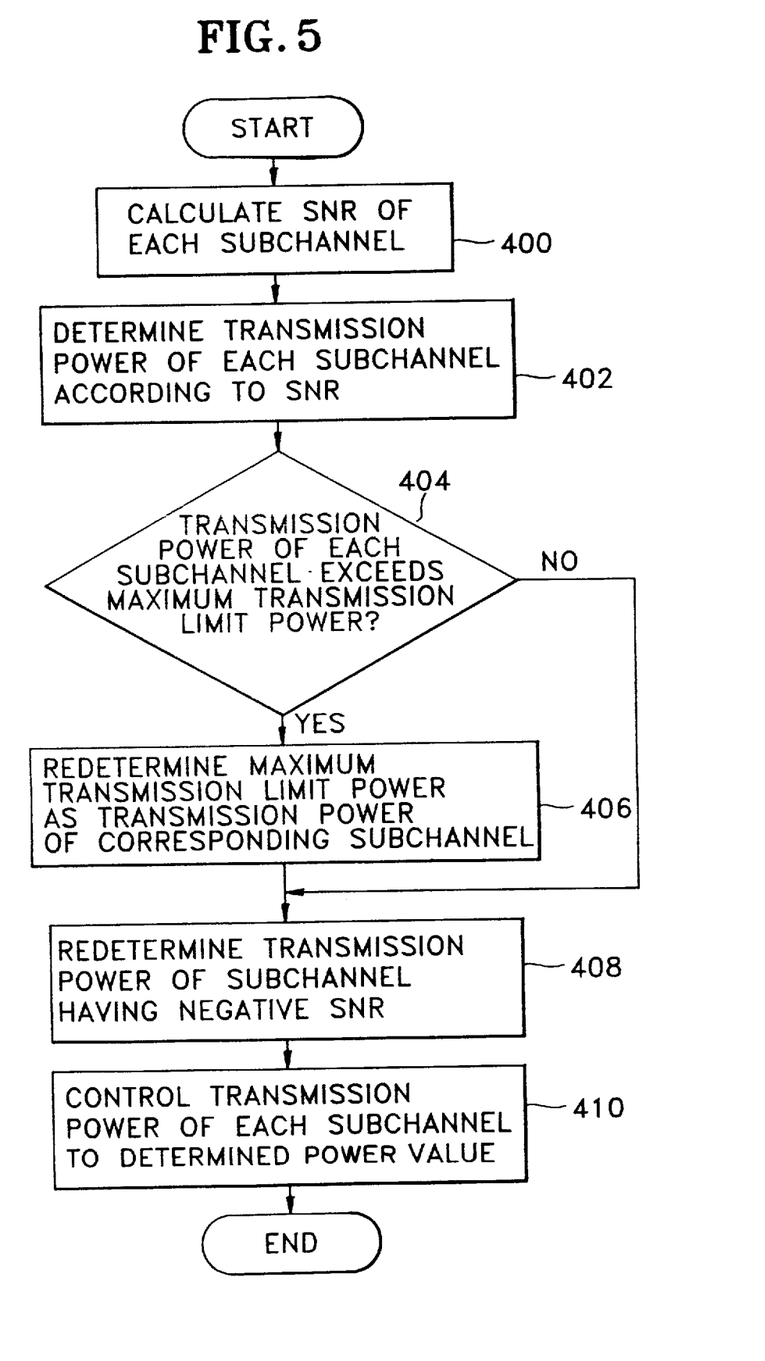
FIG. 5 is a flowchart illustrating an adaptive power allocating method for the multicarrier transmission system according to the present invention.
Figure 7:
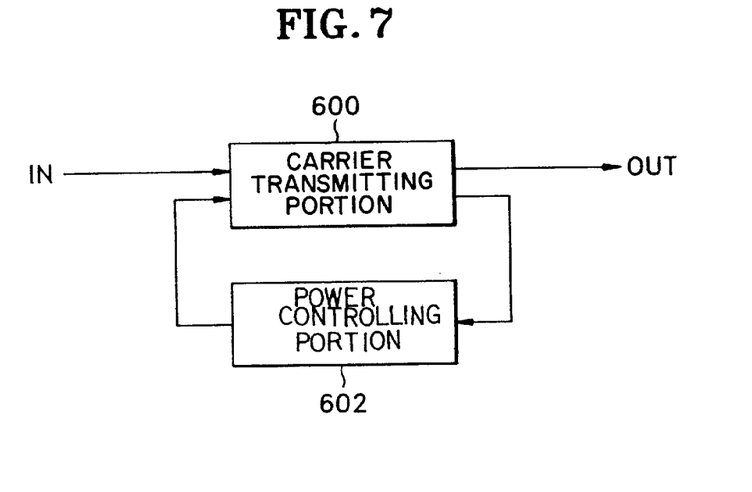
FIG. 7 is a schematic block diagram illustrating an adaptive power allocating apparatus according to the present invention.

Referring to FIG. 7, an adaptive power allocating apparatus according to the present invention which is for performing the method shown in FIG. 5 includes a carrier transmitting portion 600 and a power controlling portion 602.

Figure 8:
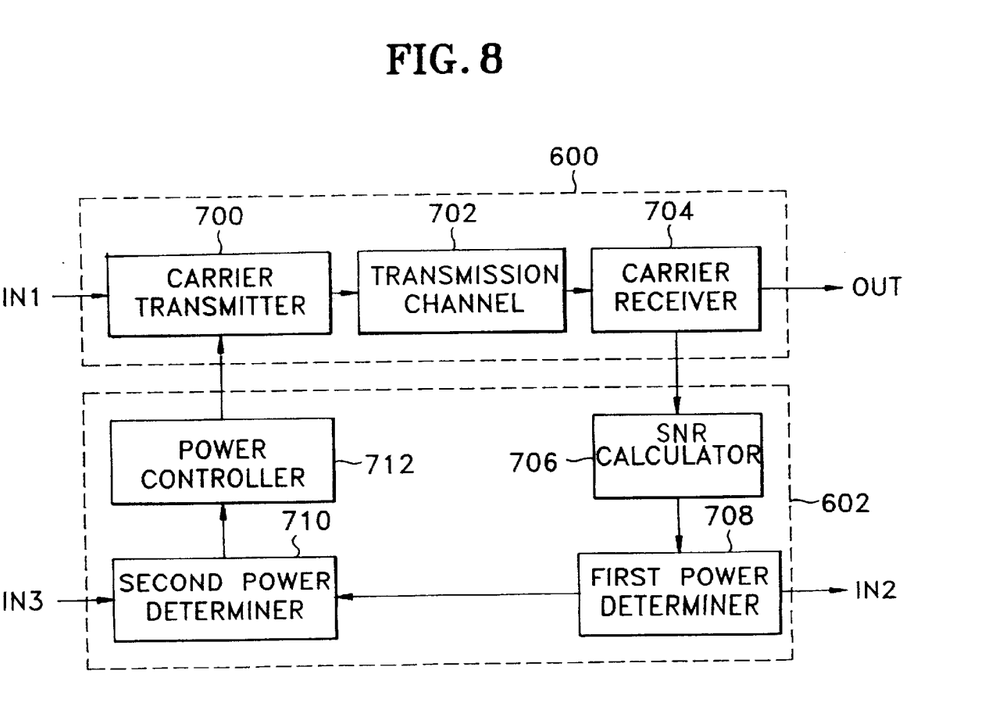
FIG. 8 is a detailed block diagram of the adaptive power allocating apparatus shown in FIG. 7.

As shown in FIG. 8, carrier transmitting portion 600 comprises a carrier transmitter 700, a transmission channel 702 and a carrier receiver 704. Power controlling portion 602 comprises an SNR calculator 706, a first power determiner 708, a second power determiner 710 and a power controller 712.

In FIG. 8, a data signal input to an input terminal IN1 is modulated and amplified in carrier transmitter 700, and then transmitted to carrier receiver 704 via transmission channel 702. Here, the data signal is transmitted with the transmission power having a predetermined initial value set for each subchannel. The data signal received at carrier receiver 704 maybe lost and/or distorted by noise during transmission via transmission channel 702. The received signal is converted into an analog or digital form whichever is the form required by SNR calculator 706 in carrier receiver 704.

Turning to FIGS. 5 and 8, SNR calculator 706 calculates noise sensitivity for each subchannel after receiving the data signal, and divides the signal sensitivity by the noise sensitivity, to thereby obtain the SNR (step 400). As general methods for calculating signal sensitivity and noise sensitivity, there are the deterministic least square (DLS) method and the Walsh method. After step 400, first power determiner 708 determines a transmission power value for each subchannel in proportion to the SNR value of each subchannel obtained in SNR calculator 706 (step 402). The transmission power values are assigned to each subchannel to transmit information. At this time, a high transmission power value is assigned to a subchannel having a high SNR and a low transmission power value is assigned to a subchannel having a low SNR. This control is for well compensating transmission loss in the subchannel having more information since more information is transmitted through the subchannel having a high SNR. The total sum of transmission power value of each subchannel is determined so as to be equal to the total transmission power value input to an input terminal IN2.

After step 402, second power determiner 710 determines the power value of each subchannel determined in first power determiner 708 if the maximum values, $P_1, P_2, \ldots, P_N$, of transmission power in the transmission band width are limited according to the frequency bands $f_1, f_2, \ldots, f_N$. Here, if N is equal to 0, there is no power limit, and $P_1$ is defined as the maximum power value of frequency band $f_1$. The above limit of transmission power according to the band, that is, a predetermined limit determined according to the required standard of the system, is for reducing the interference phenomenon caused by the action of the transmission signal of the system as an interference signal in other transmission systems.

To secondly determine the transmission power, the second power determiner 710 searches the subchannels having a transmission power exceeding $P_x$, which is the maximum transmission power limit defined as the maximum power value at a given frequency band $f_x$ (step 404). For step 404, $P_x$ of each subchannel is input via an input terminal IN3. If step 404 is satisfied, $P_x$ is redetermined as the transmission power of the corresponding subchannel. After subtracting $P_x$ which is the transmission power value of the subchannels, the remaining power is distributed to the subchannel having the highest transmission power among the subchannels whose transmission power is not over the $P_x$, within the range of the maximum transmission power limit of the corresponding subchannel at the given frequency band $f_x$, to perform the second redetermination (step 406). After step 406, the SNR of each subchannel is recalculated and if the SNR is a negative value, the transmission power of the subchannel is thirdly redetermined (step 408). After step 408, power controller 712 receives the output of second power determiner 710. Power controller 712 generates a control signal for controlling the transmission power of each subchannel output from carrier transmitter 700 to be equal to that provided from second power determiner 710.

Figure 6:
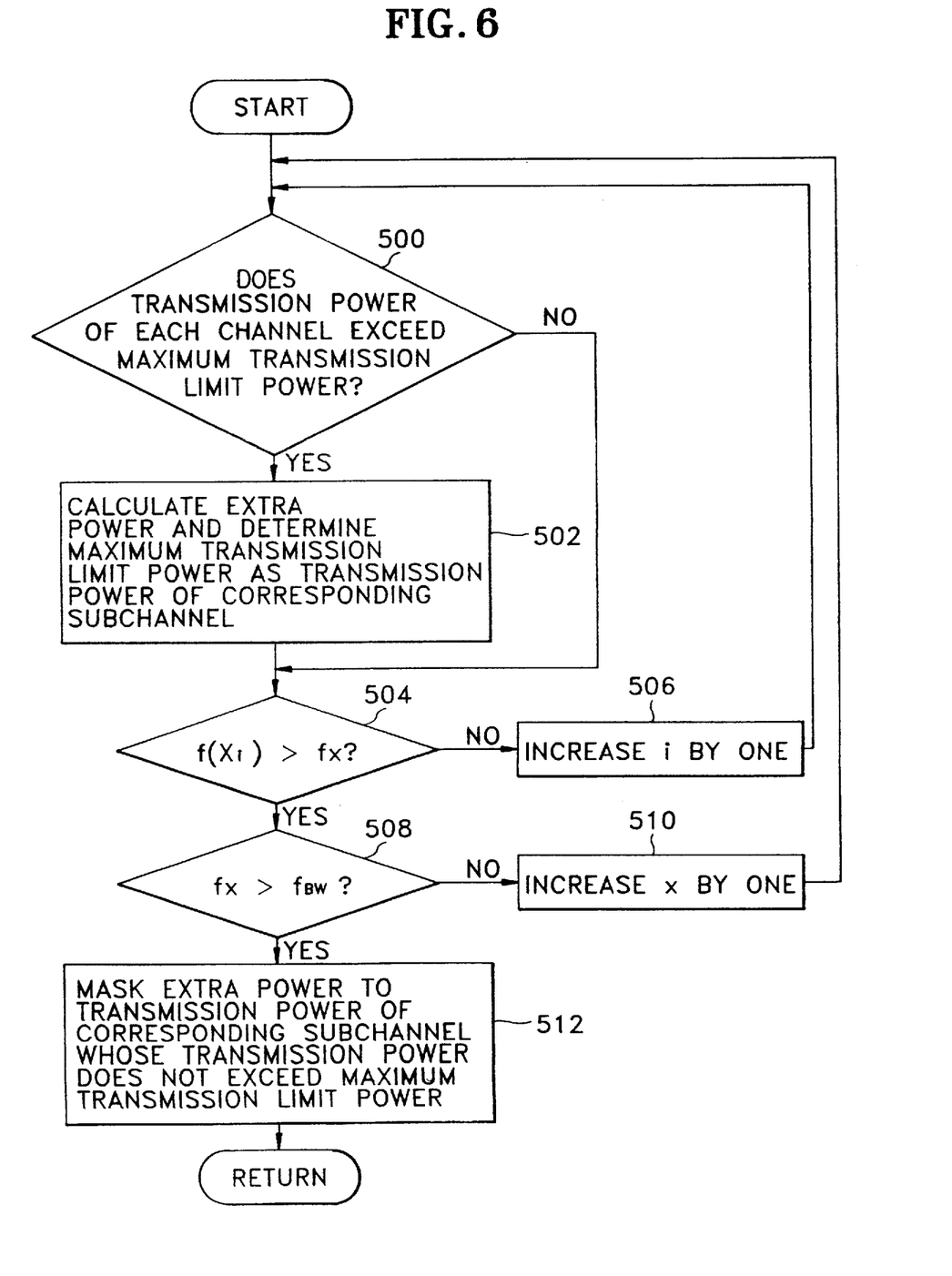
FIG. 6 is a flowchart illustrating steps 406 to 408 shown in FIG. 5 in detail.

Steps 406 to 408, the second and third power determination steps, will be described in more detail with reference to FIG. 6. After step 404, it is judged whether the power of each subchannel determined at step 402 exceeds $P_x$ (step 500). After step 500 is satisfied, the remaining power exceeding $P_x$ is obtained and the maximum transmission power is determined as the transmission power of the subchannel (step 502). If step 500 is not satisfied or after step 502, it is judged whether the frequency of the ith subchannel is greater than the frequency of the xth power limit (step 504). If step 504 is not satisfied, step 500 is performed by increasing i (subchannel number) by one (step 506). If step 504 is satisfied, it is judged whether the frequency of the xth power limit is greater than the frequency $f_{BW}$ indicating the end of the transmission band (step 508). If step 508 is not satisfied, step 500 is performed by increasing x (power limit number) by one (step 510). After step 508, the remaining power is assigned to the subchannel having the highest transmission power among the subchannels in which the power determined at step 402 is less than $P_x$ and the transmission power of the subchannel is redetermined (step 512).

According to the multicarrier transmission system of the present invention, the reception side of the adaptive power allocating apparatus detects SNR information and determines the power allocating suitable for the SNR information, and then control the transmission power of the transmission side. Thus, all or part of power controlling portion 602 shown in FIG. 7 may be freely located in carrier transmitter 700 or carrier receiver 704 of carrier transmitting portion 600.

An adaptive power allocating apparatus for the multicarrier transmission system according to a preferred embodiment of the present invention, which includes power controlling portion 602 at the transmission side, comprises a carrier transmission processing portion (corresponding to carrier transmitter 700 including power controlling portion 602 shown in FIG. 7) for determining the transmission power of each subchannel according to the information amount of the data signal by receiving a control signal, processing the original data signal, and outputting the processed data signal for transmission of the processed data signal via the transmission channel with the determined transmission power, and a carrier reception portion (corresponding to carrier receiver 704 shown in FIG. 8) for outputting the restored data signal and feedback data signal by processing the output of the carrier transmission processing portion, which is lost and distorted by noise during transmission via the transmission channel.

The carrier transmission processing portion comprises a carrier transmission portion (corresponding to carrier transmitter 700 shown in FIG. 8) for modulating and amplifying the original data signal, and transmitting the data signal via the transmission channel with the transmission power determined in response to the control signal, an SNR calculating portion (corresponding to SNR calculator 706 shown in FIG. 8) for calculating the SNR by receiving the feedback data signal, a first power determining portion (corresponding to first power determiner 708 shown in FIG. 8) for determining the transmission power value for each subchannel by receiving the total transmission power and the SNR value, a second power determining portion (corresponding to second power determiner 710 shown in FIG. 8) for redetermining the power value for each subchannel by receiving the output of the first power determining portion and the maximum limit of transmission power for each transmission band, if the transmission power value within the transmission band is a maximum limit value and above, and a power controlling portion (corresponding to power controller 712 shown in FIG. 8) for outputting the control signal by receiving the output of the second power determining portion.

An adaptive power allocating apparatus for the multicarrier transmission system according to another preferred embodiment of the present invention, which includes power controlling portion 602 at the reception side, comprises a carrier transmission portion (corresponding to carrier transmitter portion 700 shown in FIG. 8) for receiving and processing the data signal, and outputting the data signal to be transmitted via the transmission channel with the determined transmission power in response to the control signal, and a carrier reception processing portion (corresponding to carrier receiver 704 including power controlling portion 602 shown in FIG. 7) for outputting the restored original data signal after receiving and processing the data signal which is lost and distorted by noise via the transmission channel during transmission, and outputting the control signal by determining the transmission power according to information amount of distorted and lost data signal.

The carrier reception processing portion comprises a carrier reception portion (corresponding to carrier receiver 704 shown in FIG. 7) for receiving the distorted and lost data signal and restoring the received data signal to the original data signal, an SNR calculating portion (corresponding to SNR calculator 706 shown in FIG. 8) for calculating the SNR by receiving the output of the carrier reception portion, a first power determining portion (corresponding to first power determiner 708 shown in FIG. 8) for determining the transmission power value of each subchannel by receiving the total transmission power and the SNR value, a second power determining portion (corresponding to second power determiner 710 shown in FIG. 8) for redetermining the power value for each subchannel by receiving the output of the first power determining portion and the maximum transmission power limit for each transmission band, if the transmission power value in the transmission band is a maximum limit value and above, and a power controlling portion (corresponding to power controller 712 shown in FIG. 8) for outputting the control signal for controlling the transmission power of each subchannel by receiving the output of the second power determining portion.

The control signal can be transmitted to the transmission side by using the multicarrier transmission system or the prior art such as copper wired line or a modem.

Figure 9:
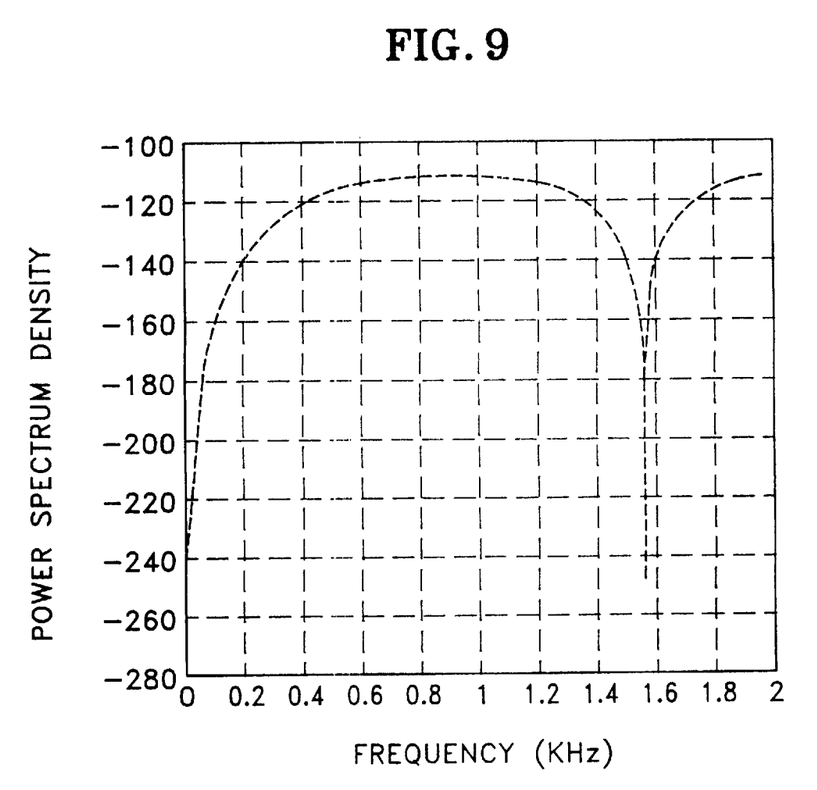
FIG. 9 is a graph showing the power spectrum density of T1-NEXT signal.

As shown in FIG. 9, the power of the interference signal always sharply decreases at a specific frequency due to the proper characteristic of the T1 carrier. If the interference signal introduced in an intended transmission pathway is sensitive to the frequency as above, relatively more information is assigned to the subchannel in which the power of the interference signal is small. Also, if the transmission power of this subchannel is selectively increased, the deterioration in efficiency caused by the frequency sensitive interference signal can be compensated for.

In the multicarrier transmission system according to the present invention, if the transmission band is 0–2 MHz, and there is T1-NEXT interference as shown in FIG. 9, and the power limit is set as shown in FIG. 4, the adaptive power allocating method and apparatus will be described as follows.

Figure 10A:
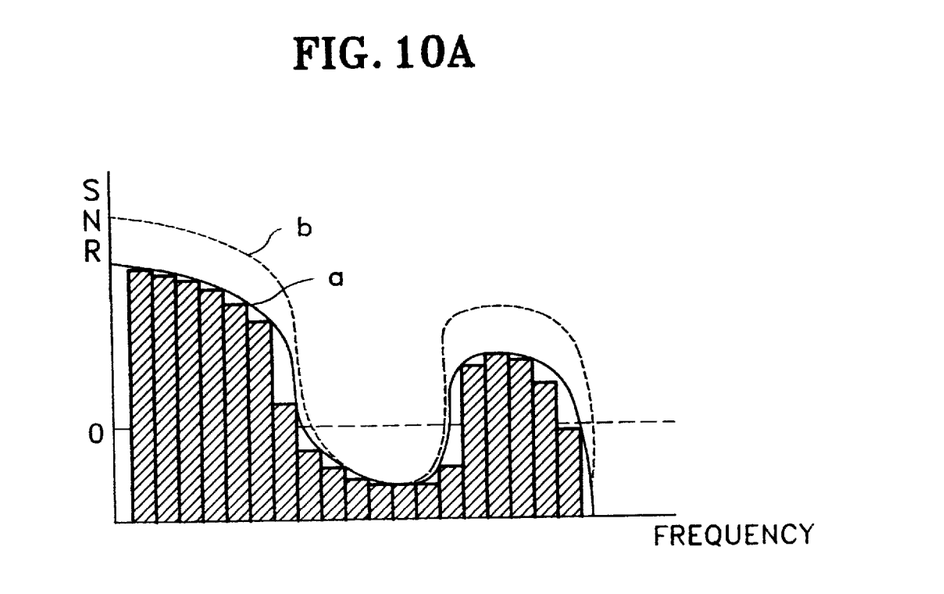
FIGS. 10A and 10B are graphs showing the SNR value obtained from SNR calculator and power determined in a first power determining portion shown in FIG. 8.

FIG. 10A is a graph showing the SNR value calculated by SNR calculator 706 shown in FIG. 8 before power allocating. Here, a is a graph showing the SNR value after step 410, and b is a graph showing the SNR value before step 410.

Figure 10B:
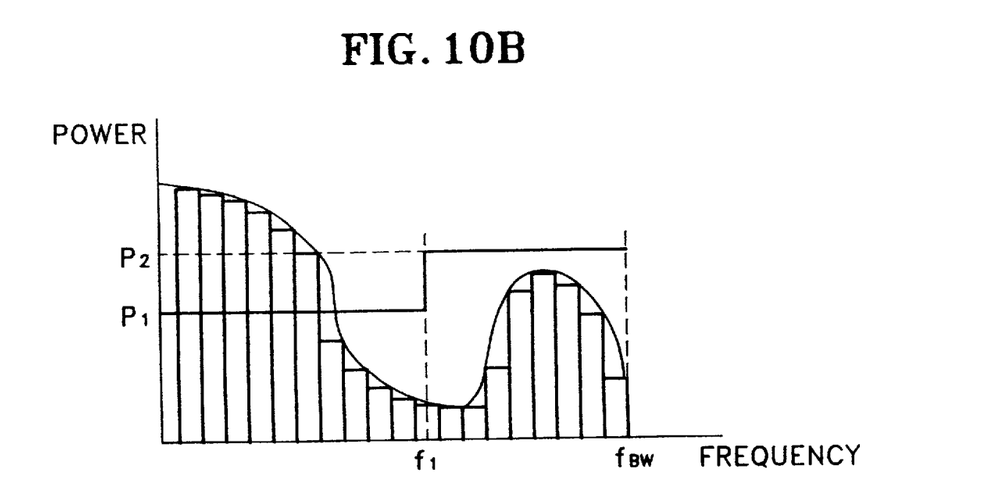

FIG. 10B is a graph showing the power allocated by first power determiner 708 shown in FIG. 8 according to the frequency band.

Referring to the drawings, the operation of the adaptive power allocating apparatus according to the present invention will be described below.

Figure 11A:
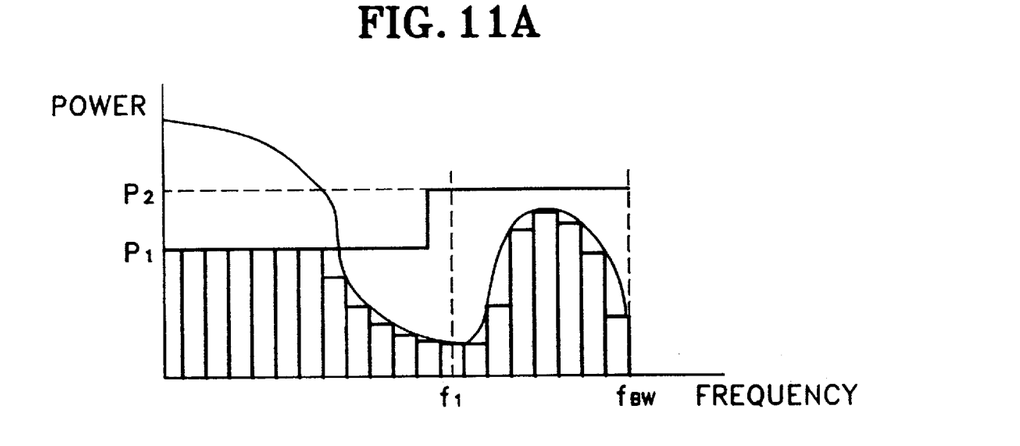
FIGS. 11A to 11C are graphs illustrating the power redetermining step of a second power determining portion shown in FIG. 8.
Figure 11B:
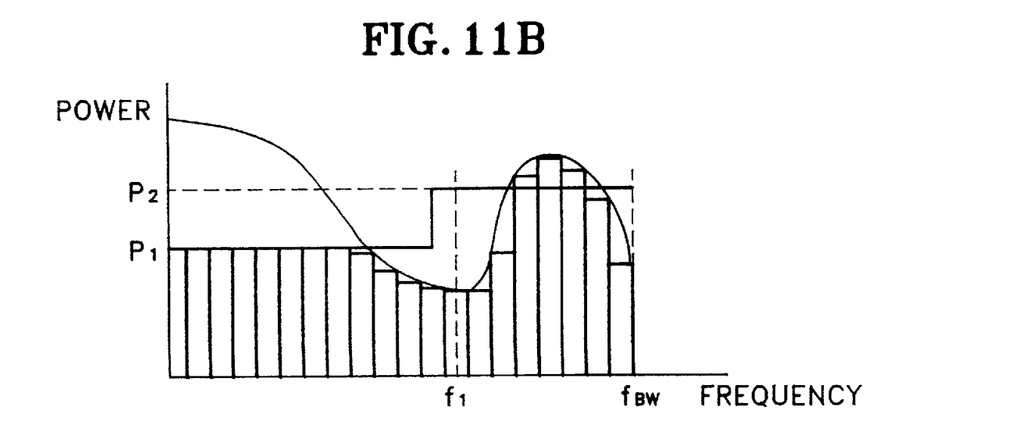
Figure 11C:
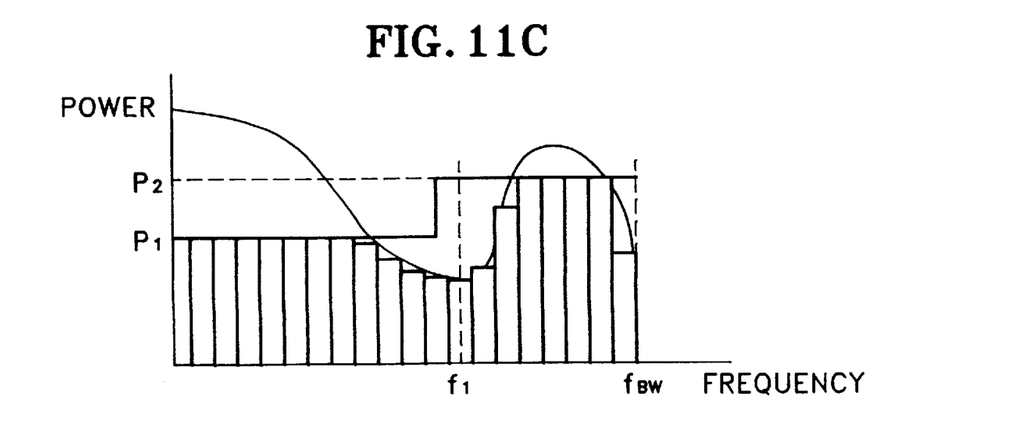

In FIG. 4, the power limit is $P_1$ at frequency band $f_1$ and $P_2$ at frequency band $f_2$. Thus, first, with respect to power limit $P_1$ at frequency band $f_1$, $P_1$ is redetermined as the transmission power of the corresponding subchannel, if the power determined by first power determiner 708 exceeds $P_1$ as shown in FIG. 11A. The remaining power after the redetermination of the transmission power with respect to power limit $P_1$ is assigned to a subchannel whose power does not exceed power limit $P_1$ as shown in FIG. 11B, in proportion to the magnitude of power thereof, to thereby redetermine the transmission power of the corresponding subchannel. Similarly, with respect to power limit $P_2$ at frequency band $f_2$, $P_2$ is redetermined as the transmission power of the corresponding subchannel, if the power value of the subchannel exceeds $P_2$ at the upper frequency band as shown in FIG. 11C. The remaining power after the redetermination of the transmission power with respect to power limit $P_2$ is allocated in second power determiner 710.

Figure 12A:
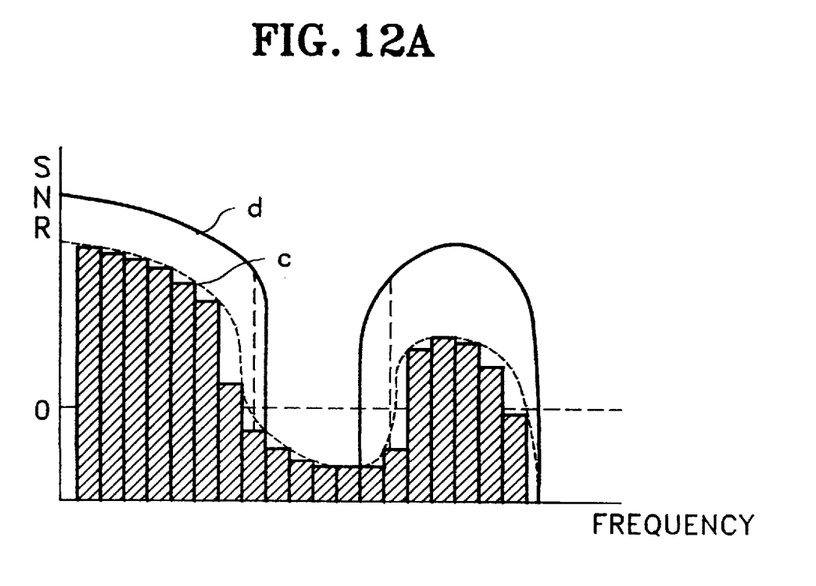
FIGS. 12A and 12B are graphs showing SNR value and power allocating according to the present invention.
Figure 12B:
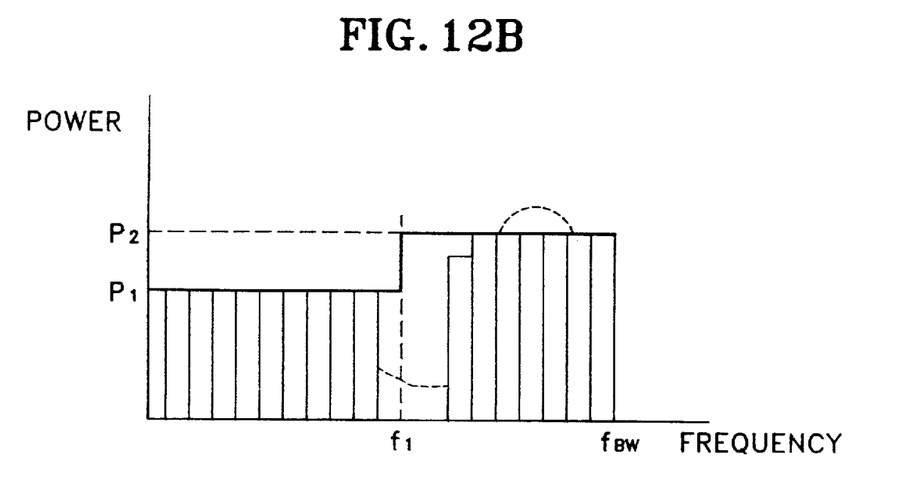

Finally, the power assigned to the subchannels whose SNR value is negative is collected and then the collected power is reallocated to the subchannels whose transmission power does not exceed $P_1$ or $P_2$. Consequently, the SNR value newly calculated according to the present invention is shown in FIG. 12A. Here, c represents the SNR value after step 410 and d represents the SNR value before step 410, respectively. Also, FIG. 12B shows the final allocated power.

As described above, according to the adaptive power allocating method and apparatus for the multicarrier transmission system of the present invention, the power of each subchannel is determined in proportion to the SNR value so that the power is adaptively allocated to each subchannel. That is, a large amount of data is concentrated in the subchannels having a high SNR value and less data is transmitted to the subchannels whose SNR value is reduced due to the interference signal. Therefore, the loss expected by the interference signal having the frequency selective characteristics in the using frequency band is overcome, and data transmission efficiency is increased. Also, the power is not allocated to the subchannels whose SNR value is negative, to thereby prevent power loss.

What is claimed is:

1. An adaptive power allocating method for a multicarrier transmission system in which an original data signal is transmitted with a predetermined transmission power, said data signal distorted by a noise signal during transmission is received, and the received signal is output after being restored to said original data signal, comprising the steps of:

(a) calculating an SNR for each subchannel;

(b) determining the transmission power value for each subchannel, so that a higher power value is allocated to a subchannel having a higher SNR, and a lower power value is allocated to a subchannel having a lower SNR;

(c) judging whether said transmission power value of each subchannel exceeds a maximum transmission power limit;

(d) redetermining said maximum transmission power limit as the transmission power of the subchannels whose transmission power exceeds said maximum transmission power limit if said step (c) is satisfied;

(e) redetermining the transmission power of a subchannel whose SNR is negative, if said step (c) is not satisfied or said step (d) is completed; and (f) changing the transmission power of each subchannel into the power determined at said steps (b), (d) and (e).

2. An adaptive power allocating method as claimed in claim 1, wherein said steps (d) and (e) each comprise the steps of:

(d-1) judging whether the power of each subchannel determined at said step (b) exceeds said maximum transmission power limit;

(d-2) calculating the remaining power exceeding said maximum transmission power, and redetermining said maximum transmission power as the transmission power of the corresponding subchannel if said step (d-1) is satisfied;

(d-3) judging whether the frequency of the ith subchannel is greater than that of the xth power limit, if said step (d-1) is not satisfied or said step (d-2) is completed;

(d-4) performing said step (d-1) by increasing said i (subchannel number) by one if said step (d-3) is not satisfied;

(d-5) judging whether the frequency of the xth power limit is greater than the frequency indicating the end of the transmission band if said step (d-3) is satisfied;

(d-6) performing said step (d-1) by increasing said x (power limit number) by one if said step (d-5) is not satisfied;

(d-7) redetermining transmission powers of subchannels in which the transmission powers determined at said step (b) are less than the maximum transmission power limit by allocating said remaining power to said subchannels in sequence according to the magnitude of transmission power of the subchannel, if said step (d-5) is satisfied.

3. An adaptive allocating method as claimed in claim 1, wherein said step (e) comprises the step of reallocating the power of a subchannel whose SNR value is negative to subchannels whose power does not exceed said maximum transmission power limit.

4. An adaptive power allocating method as claimed in claim 1, wherein said maximum transmission power limit is comprises of one or more power limits whose total power is equal to a predetermined total power.

5. An adaptive power allocating apparatus for a multicarrier transmission system comprising:

carrier transmission means for transmitting an original data signal with a transmission power determined in response to a control signal, receiving said data signal distorted by a noise signal during transmission, and restoring the received data signal to said original data signal to output said restored data signal; and power controlling means for determining the transmission power for each subchannel based on an SNR value of said distorted data signal, and outputting said control signal for controlling said data signal in order to be transmitted using said determined transmission power, such that more data is assigned to a subchannel of a frequency region having a higher SNR value as compared to a subchannel of another frequency region having a lower SNR value.

6. An adaptive power allocating apparatus as claimed in claim 5, wherein said power controlling means comprises:

an SNR calculator for calculating an SNR by receiving the output of said carrier transmission means;

first power determining means for determining said transmission power value by receiving total transmission power of said carrier transmission means and said SNR of each subchannel;

second power determining means for redetermining the transmission power value of each subchannel by receiving the output of said first power determining means and a maximum transmission power limit for each transmission band, if the transmission power of each subchannel exceeds said maximum transmission power limit within the transmission band; and a power controller for outputting said control signal by receiving the output of said second power determining means.

7. An adaptive power allocating apparatus for a multicarrier transmission system comprising:

carrier transmission processing means for determining a transmission power for each subchannel according to information amount in an original data signal based on an SNR value of a feedback data signal, processing the original data signal, and outputting said processed data signal for transmission via a transmission channel with said determined transmission power; and carrier reception means for restoring said original data signal by processing the data signal which is output from said carrier transmission processing means, and which is partially lost and/or distorted by noise during transmission via said transmission channel, and outputting the restored data signal and the feedback data signal wherein more data is assigned to a subchannel of a frequency region having a higher SNR value as compared to a subchannel of another frequency region having a lower SNR value.

8. An adaptive power allocating apparatus as claimed in claim 7, wherein said carrier transmission processing means comprises:

carrier transmission means for modulating and amplifying said original data signal, and transmitting said modulated and amplified data signal via said transmission channel with said determined transmission power in response to the control signal;

SNR calculating means for calculating an SNR by receiving said feedback data signal;

first power determining means for determining said transmission power value for each subchannel by receiving a total transmission power and said SNR value;

second power determining means for redetermining the power value for each subchannel by receiving the output of said first power determining means and a maximum transmission power limit of each transmission band if the transmission power of each subchannel exceeds said maximum transmission power limit within the transmission band;

power controlling means for outputting said control signal by receiving the output of said second power determining means.

9. An adaptive power allocating apparatus for a multicarrier transmission system comprising:

carrier transmission means for receiving and processing an original data signal, and outputting the data signal to be transmitted via a transmission channel with a transmission power determined in response to a control signal; and carrier reception processing means for receiving and processing the data signal which is partially lost and distorted by noise via said transmission channel during transmission to be restored, outputting the restored data signal and calculating an SNR value of said distorted and partially lost data signal, and outputting said control signal by determining said transmission power according to the information amount of said distorted and partially lost data signal wherein more data is assigned to a subchannel of a frequency region having a higher SNR value as compared to a subchannel of another frequency region having a lower SNR value.

10. An adaptive power allocating apparatus as claimed in claim 9, wherein said carrier reception processing means comprises:

carrier reception means for receiving said distorted and partially lost data signal to be restored to the original data signal;

SNR calculating means for calculating an SNR by receiving the output of said carrier reception means;

first power determining means for determining said transmission power value of each subchannel by receiving a total transmission power and said SNR value;

second power determining means for redetermining the power value of each subchannel by receiving the output of said first power determining means and a maximum transmission power limit of each transmission band if the transmission power of each subchannel exceeds the maximum transmission power limit within the transmission band; and power controlling means for outputting said control signal for controlling said transmission power of each subchannel by receiving the output of said second power determining means.

11. An adaptive power allocating apparatus as claimed in claim 9, wherein said control signal is can be transmitted to said carrier transmission means by using a copper wired line or a modem.

* * * * *